(12) United States Patent
Takashimizu (10) Patent No.: US 11,124,117 B2
(45) Date of Patent: Sep. 21, 2021

(54) IMAGING DEVICE, DISPLAY SYSTEM, AND DISPLAY METHOD

(71) Applicant: SONY CORPORATION, Tokyo (JP)

(72) Inventor: Toru Takashimizu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/342,305

(22) PCT Filed: Nov. 10, 2017

(86) PCT No.: PCT/JP2017/040616
§ 371 (c)(1),
(2) Date: Apr. 16, 2019

(87) PCT Pub. No.: WO2018/096953
PCT Pub. Date: May 31, 2018

(65) Prior Publication Data
US 2019/0270409 A1 Sep. 5, 2019

(30) Foreign Application Priority Data

Nov. 22, 2016 (JP) .............................. JP2016-226479

(51) Int. Cl.
*B60R 1/06* (2006.01)
*B60R 1/00* (2006.01)
(Continued)

(52) U.S. Cl.
CPC .................. *B60R 1/00* (2013.01); *B60R 1/06* (2013.01); *B60R 1/088* (2013.01); *B60R 1/12* (2013.01);
(Continued)

(58) Field of Classification Search
CPC ..... B60R 2001/1253; B60R 1/06; B60R 1/02; B60R 1/088; B60R 1/00; B60R 1/12;
(Continued)

(56) References Cited

U.S. PATENT DOCUMENTS 5,523,811 A * 6/1996 Wada ........................ B60R 1/00
348/118
2008/0304819 A1 12/2008 Tolbert
(Continued)

FOREIGN PATENT DOCUMENTS

CN 101836158 A 9/2010
DE 102010002122 A1 10/2010
(Continued)

OTHER PUBLICATIONS

International Search Report and Written Opinion of PCT Application No. PCT/JP2017/040616, dated Feb. 6, 2018, 10 pages of ISRWO.

*Primary Examiner* — Hongmin Fan
(74) *Attorney, Agent, or Firm* — Chip Law Group (57) ABSTRACT

The present technology relates to an imaging device, a display system, and a display method capable of improving visibility. The imaging device includes an imaging unit and a light control element. The light control element is arranged at a position intersecting with an optical axis of the imaging unit and adapted to change a transmittance or a reflectance of light when a predetermined condition is satisfied. The present technology can be applied to a display system of a vehicle.

13 Claims, 5 Drawing Sheets

(51) Int. Cl.
    *H04N 5/225*    (2006.01)
    *B60R 1/12*    (2006.01)
    *H04N 7/18*    (2006.01)
    *G03B 11/00*    (2021.01)
    *B60R 1/08*    (2006.01)
    *G03B 17/18*    (2021.01)

(52) U.S. Cl.
    CPC .............. *G03B 11/00* (2013.01); *G03B 17/18* (2013.01); *H04N 5/225* (2013.01); *H04N 5/2252* (2013.01); *H04N 5/22525* (2018.08); *H04N 7/18* (2013.01); *B60R 2001/1253* (2013.01)

(58) Field of Classification Search
    CPC .. G02F 1/19; G02F 1/15; G03B 17/18; G03B 11/00; H04N 5/225; H04N 5/22525; H04N 5/2252; H04N 7/18
    See application file for complete search history.

(56) References Cited

U.S. PATENT DOCUMENTS

| | | | |
|---|---|---|---|
| 2010/0208074 | A1* | 8/2010 | Hattori .................... B60Q 1/50 348/148 |
| 2014/0285627 | A1 | 9/2014 | Kuboi |
| 2018/0056876 | A1* | 3/2018 | Okohira ................ G02F 1/1533 |
| 2018/0173076 | A1* | 6/2018 | Katagiri ............. C23C 14/0036 |
| 2018/0252978 | A1* | 9/2018 | Feng ........................ B60R 1/04 |

FOREIGN PATENT DOCUMENTS

| | | |
|---|---|---|
| EP | 2156243 A1 | 2/2010 |
| JP | 05-294183 A | 11/1993 |
| JP | 07-186831 A | 7/1995 |
| JP | 2006-298318 A | 11/2006 |
| JP | 2010-188903 A | 9/2010 |
| JP | 2010-530157 A | 9/2010 |
| JP | 2010-273014 A | 12/2010 |
| KR | 10-2008-0107972 A | 12/2008 |
| MX | 2009011778 A | 11/2009 |
| RU | 2009149477 A | 7/2011 |
| WO | 2008/149179 A1 | 12/2008 |

\* cited by examiner

IMAGING DEVICE, DISPLAY SYSTEM, AND DISPLAY METHOD

CROSS REFERENCE TO RELATED APPLICATIONS

This application is a U.S. National Phase of International Patent Application No. PCT/JP2017/040616 filed on Nov. 10, 2017, which claims priority benefit of Japanese Patent Application No. JP 2016-226479 filed in the Japan Patent Office on Nov. 22, 2016. Each of the above-referenced applications is hereby incorporated herein by reference in its entirety.

TECHNICAL FIELD

The present technology relates to an imaging device, a display system, and a display method, and particularly relates to an imaging device, a display system, and a display method capable of improving visibility.

BACKGROUND ART

In the related art, there is a known technology in which a camera to check a rear side is incorporated in a door mirror of a vehicle such as a passenger car.

For example, in a case where a transparent member is arranged at a mirror position of the door mirror instead of a mirror and the camera is provided inside the door mirror, an image of a rear side of a vehicle can be captured by the camera through the transparent member, and the image can be displayed on a display unit in a vehicle interior.

Thus, a vehicle operator or the like can check the rear side of the vehicle by looking at the image. However, in this case, when the camera malfunctions, the vehicle operator or the like cannot check the rear side of the vehicle by using the door mirror.

Accordingly, there is a proposed technology in which a half mirror is arranged at the mirror position of the door mirror, and the vehicle operator or the like can visually check the rear side of the vehicle by looking at not only an image captured by the camera but also the half mirror portion of the door mirror (see e.g., Patent Document 1).

CITATION LIST

Patent Document

Patent Document 1: Japanese Patent Application Laid-Open No. 7-186831

SUMMARY OF THE INVENTION

Problems to be Solved by the Invention

However, it is difficult to check a rear side of a vehicle with sufficient visibility in a technology described above.

Specifically, in the technology of providing a door mirror with a camera and a half mirror, a half of light incident on the door mirror from the outside is reflected by the half mirror and the other half of the light is incident on the camera. Due to this, a sufficient light amount cannot be secured in the camera, an image turns out to be dark, and visibility is deteriorated. In other words, since a transmittance of the half mirror is not sufficient, performance of the camera is substantially deteriorated.

Additionally, when the camera malfunctions or the like, a user can check the rear side of the vehicle by looking at the half mirror portion, but visibility may be deteriorated and rear side of the vehicle can be hardly checked sufficiently because a reflectance of the half mirror is low.

The present technology is made in view of the above-described situations, and directed to achieving improvement of visibility.

Solutions to Problems

An imaging device in a first aspect of the present technology includes: an imaging unit; a light control element arranged at a position intersecting with an optical axis of the imaging unit and adapted to change a transmittance or a reflectance of light when a predetermined condition is satisfied.

The light control element can include an electrochromic material, a thermochromic material, or a gas chromic material.

The light control element can be made to have the transmittance or the reflectance that is changed in accordance with applied voltage or applied current.

The light control element can be set, in accordance with the applied voltage or the applied current, to a mirror surface state in which incident light is reflected or to a transmissive state in which the incident light is transmissive.

The imaging device can be attached to a vehicle.

The imaging unit can be arranged at a position where the imaging unit can capture an image of a rear side of the vehicle.

The imaging device can capture an image of a periphery of the vehicle and can be arranged at a position visible from an occupant on a seat of the vehicle.

In the first aspect of the present technology, provided are: the imaging unit; and the light control element arranged at the position intersecting with the optical axis of the imaging unit and adapted to change the transmittance or the reflectance of the light when the predetermined condition is satisfied.

A display system in a second aspect of the present technology includes: an imaging unit; a light control element arranged at a position intersecting with an optical axis of the imaging unit and adapted to change a transmittance or a reflectance of light when a predetermined condition is satisfied; and a display unit adapted to display an image captured by the imaging unit.

The light control element can include an electrochromic material, a thermochromic material, or a gas chromic material.

The light control element can be made to have the transmittance or the reflectance that is changed in accordance with applied voltage or applied current.

The light control element can be set, in accordance with the applied voltage or the applied current, to a mirror surface state in which incident light is reflected or to a transmissive state in which the incident light is transmissive.

The display system can further include a control unit adapted to change the light control element to either the transmissive state or the mirror surface state in accordance with operation by a user.

The display system can further include a warning output unit adapted to output a warning in a case where no image is received in the display unit.

The display system can further include: a determination unit adapted to determine visibility in the image on the basis of the image; and a warning output unit adapted to output a warning in accordance with a determination result by the determination unit.

The imaging unit and the light control element can be attached to a vehicle.

The imaging unit can be arranged at a position where the imaging unit can capture an image of a rear side of the vehicle.

The imaging unit can capture an image of a periphery of the vehicle and the light control element can be arranged at a position visible from an occupant on a seat of the vehicle.

A display method in the second aspect of the present technology is a display method in a display system including: an imaging unit; a light control element arranged at a position intersecting with an optical axis of the imaging unit and adapted to change a transmittance or a reflectance of light when a predetermined condition is satisfied; and a display unit adapted to display an image captured by the imaging unit, and the display method includes steps of: capturing, by the imaging unit, the image by receiving incident light through the light control element; and displaying the image by the display unit.

In the second aspect of the present technology, an image is captured by the imaging unit receiving incident light through the light control element, and the image is displayed by the display unit in the display system including: the imaging unit; the light control element arranged at the position intersecting with the optical axis of the imaging unit and adapted to change the transmittance or the reflectance of the light when the predetermined condition is satisfied; and the display unit adapted to display the image captured by the imaging unit.

Effects of the Invention

In the first aspect and the second aspect of the present technology, visibility can be improved.

Note that the effect recited here is not necessarily limited and may include any one of effects recited in the present disclosure.

MODE FOR CARRYING OUT THE INVENTION

In the following, embodiments of the present technology will be described with reference to the drawings.

First Embodiment

About Present Technology

In the present technology, it is possible to improve visibility at the time of checking a rear side of a vehicle by incorporating a camera in a door mirror of the vehicle and providing a light control element at a position intersecting with an optical axis of the camera.

In the following, note that a case where the present technology is applied to a passenger car (automobile) will be described as an example, but the present technology is applicable not only to automobiles such as an electric car and a hybrid electric vehicle but also moving bodies such as a motorcycle, a bicycle, an electric wheelchair, a personal mobility, an airplane, a ship, an electric train, and a robot.

Now, more specific embodiments will be described below.

Figure 1:
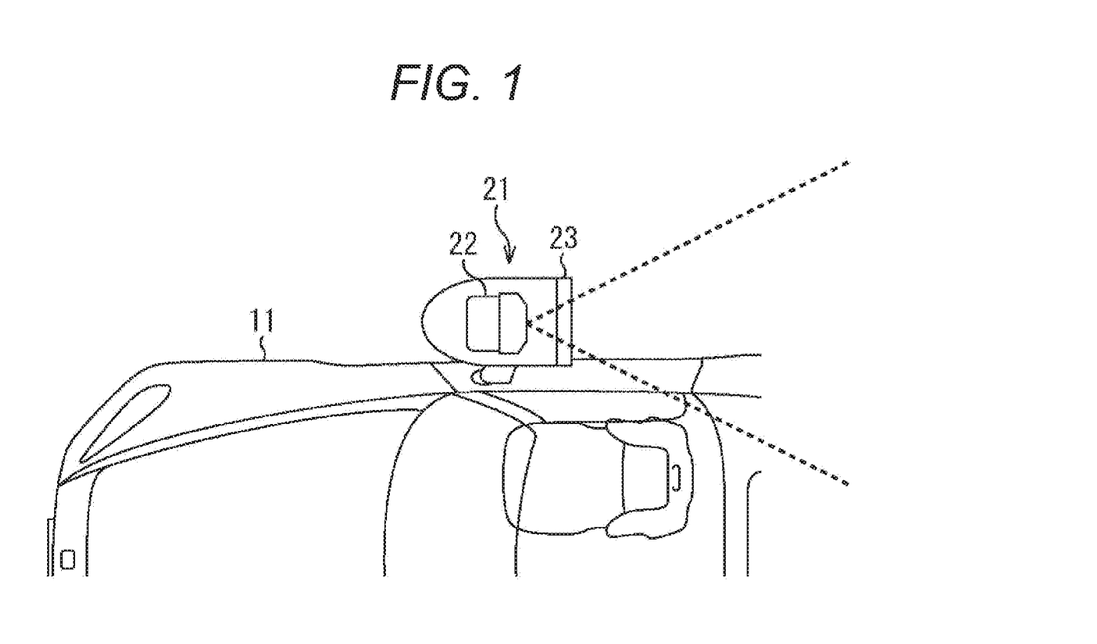
FIG. 1 is a view to describe the present technology.

In a vehicle to which the present technology is applied, an imaging unit 22 including a camera is arranged inside a casing of a door mirror 21 of a vehicle 11, and the imaging unit 22 has a front surface on which a plate-like light control element 23 to adjust an amount of light incident on the imaging unit 22 from the outside is arranged as illustrated in FIG. 1, for example.

In the example illustrated in FIG. 1, a left side in the drawing represents a front side of the vehicle 11, and a right side in the drawing represents a rear side of the vehicle 11.

The imaging unit 22 is fixed to the casing of the door mirror 21 of the vehicle 11 so that a rear region of the vehicle 11 is set as a visual field, in other words, so that an image of the rear region of the vehicle 11 can be captured. In this example, a range of the visual field of the imaging unit 22 is indicated by dotted lines in the drawing.

Additionally, the light control element 23 is fixed at a position on the front surface of the imaging unit 22, more specifically, at a position intersecting with an optical axis of the imaging unit 22. Therefore, the light from the rear side of the vehicle 11 is incident on the imaging unit 22 through the light control element 23.

The light control element 23 includes a material having a light transmittance or a light reflectance which is changed when a predetermined condition is satisfied, for example.

Examples of the material constituting the light control element 23 can include, for example, an electrochromic material having a light transmittance reversibly changed by applying current or voltage, a thermochromic material having a light transmittance changed by a temperature, a gas chromic material having a light transmittance changed by controlling an atmosphere gas, and the like.

For example, in a case where the light control element 23 includes the electrochromic material, the transmittance or the reflectance is changed when voltage of predetermined threshold voltage or higher is applied.

Specifically, when the light control element 23 is in a non-energized state, for example, in a state in which the voltage lower than the threshold voltage is applied to the light control element 23, the light control element 23 is set to a state in which substantially all of the incident light is transmitted (hereinafter also referred to as a transmissive state).

Conversely, in a state in which the voltage of the threshold voltage or higher is applied to the light control element 23, the light control element 23 is set to a state in which most of the incident light is reflected and the light control element 23 functions as a mirror (hereinafter also referred to as a mirror surface state).

In the case where the light control element 23 includes the electrochromic material as described above, the light control element 23 is set to either the transmissive state or the mirror surface state depending on whether or not the voltage of the threshold voltage or higher is applied.

Note that an example in which the light control element 23 is set to the transmissive state during the non-energized state will be described here, but the light control element 23 may also be set to the transmissive state during an energized state. Additionally, the description will be continued in the following, assuming that the light control element 23 includes the electrochromic material.

Since the door mirror 21 including the imaging unit 22 and the light control element 23 as described above is fixed to the vicinity of a door of the vehicle 11, an occupant such as a vehicle operator in the vehicle interior of the vehicle 11 can perform visual check. In other words, the door mirror 21 functioning as an imaging device is attached to the vehicle 11 so that the imaging unit 22 is arranged at a position where the imaging unit 22 can capture an image of the rear side of the vehicle 11 and the light control element 23 is arranged at a position visible from the occupant such as the vehicle operator on a seat of the vehicle 11.

Figure 2:
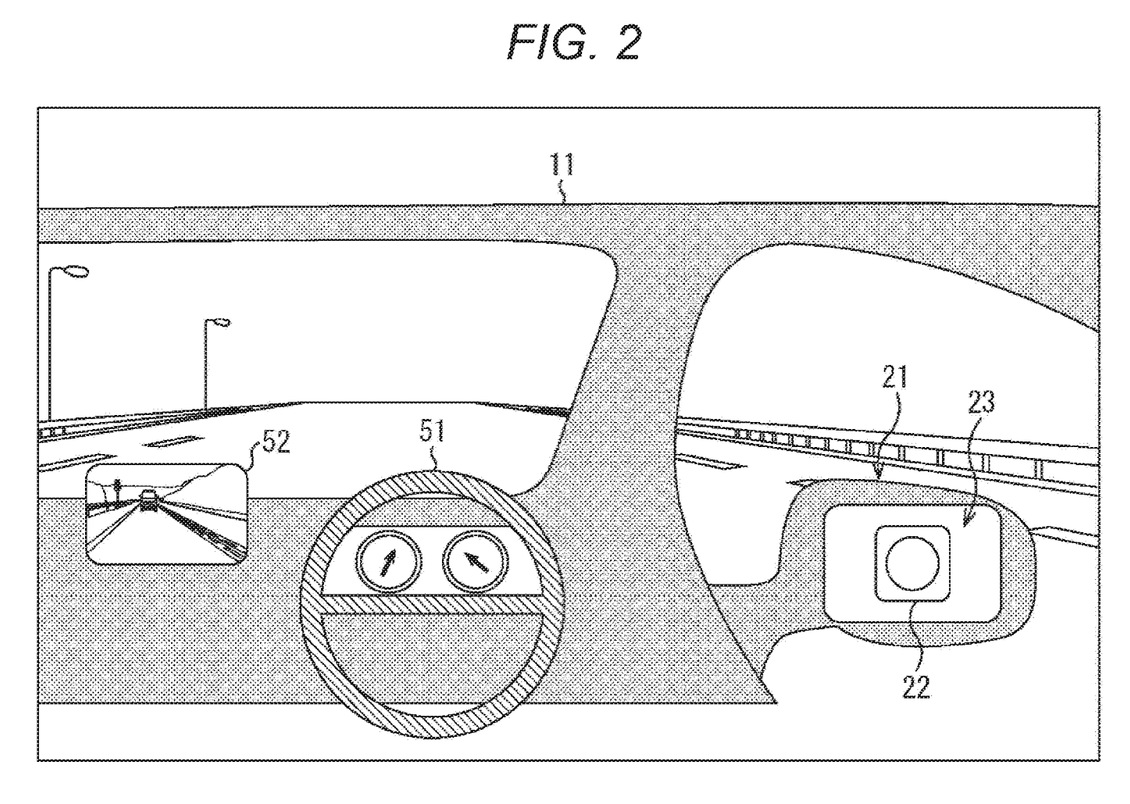
FIG. 2 is a view to describe the present technology.

For example, as illustrated in FIG. 2, the door mirror 21 is located at a position of a height substantially same as a height of a steering wheel 51 in the viewpoint of the vehicle operator on an operator seat, and the vehicle operator can visually recognize in a sufficiently large size a surface on an outer side of the light control element 23 provided at the door mirror 21. In FIG. 2, note that portions corresponding to those in the case of FIG. 1 are denoted by the same reference signs, and the description thereof will be omitted as appropriate.

In FIG. 2, the surface on the outer side of the light control element 23 (hereinafter also referred to as a visual field surface) can be visually recognized in a sufficiently large size from the vehicle operator. In this example, since the visual field surface that is the light control element 23 is in the transmissive state, the vehicle operator can visually check the imaging unit 22 arranged behind the visual field surface.

Additionally, a display unit 52 including a liquid crystal display or the like is also arranged in the vicinity of the steering wheel 51 in front of the vehicle operator. Note that the display unit 52 may be provided integrally with the vehicle 11, for example, may be provided on a meter panel or the like, or may also be attached to the vehicle 11. Furthermore, the display unit 52 may be a transmissive display device provided in a manner superposed on a windshield.

Thus, an on-vehicle display system including the door mirror 21, the display unit 52, and the like is provided in the vehicle 11 to which the present technology is applied.

In the vehicle 11, control is performed by suitably changing the light control element 23 to either the transmissive state or the mirror surface state so that the vehicle operator or the like can check the rear side of the vehicle 11 with high visibility.

For example, in a case where the light control element 23 is set to the transmissive state, most of light from the outside, particularly, light from the rear side of the vehicle 11 is transmissive through the light control element 23 and incident on the imaging unit 22. The imaging unit 22 receives the light incident through the light control element 23 and photoelectrically converts the light, thereby capturing a moving image in which the rear region of the vehicle 11 is set as a subject (hereinafter also referred to as a captured image). Then, an image signal of the captured image obtained is supplied to the display unit 52 and the captured image is displayed on the display unit 52.

The vehicle operator or the like can check a state of the rear side of the vehicle 11 by looking at the captured image displayed on the display unit 52 as described above, without looking at the visual field surface.

Additionally, in the case where the light control element 23 is in the transmissive state, the imaging unit 22 can obtain a captured image with sufficient brightness because a more light amount is incident on the imaging unit 22 than a light amount at least when a half mirror is provided at a position of the light control element 23. Consequently, the captured image on which the rear side of the vehicle 11 is clearly projected can be presented to the vehicle operator or the like, and visibility can be improved.

Additionally, for example, when the captured image is not displayed on the display unit 52 due to some reason such as malfunction, the light control element 23 is controlled so as to become the mirror surface state, and display of the captured image on the display unit 52 is stopped as appropriate.

In this case, most of the light from the outside is reflected by the surface of the light control element 23, namely, the visual field surface, and therefore, the visual field surface functions as a mirror. Therefore, the vehicle operator or the like can visually check the state of the rear side of the vehicle 11 by looking at the visual field surface.

Furthermore, in a case where the light control element 23 is in the mirror surface state, a more light amount is reflected by the visual field surface than a light amount at least when the half mirror is provided at the position of the light control element 23. Therefore, the vehicle operator or the like who visually checks the visual field surface can check the state of the rear side of the vehicle 11 with sufficient brightness, that is, with sufficient clearness, and the visibility can be improved.

Note that a shape of the visual field surface of the light control element 23 may be a planar shape, but may also be a protruding surface shape or the like in order to secure a wide visual field of the vehicle operator or the like.

Additionally, the case where the imaging device including the imaging unit 22 and the light control element 23 is the door mirror 21 is described here, but besides that, the imaging device including the imaging unit 22 and the light control element 23 is also applicable to a mirror or the like, such as an inner mirror or a fender mirror, used to check a direction that is hardly visible from the vehicle operator or the like. In such a case, the imaging device including the imaging unit 22 and the light control element 23 can capture an image of a desired region in a periphery of the vehicle 11 and is to be arranged at a position visible from an occupant such as the vehicle operator or the like on the seat of the vehicle 11.

Exemplary Configuration of Vehicle

Next, an exemplary functional configuration of the above-described vehicle 11 will be described.

Figure 3:
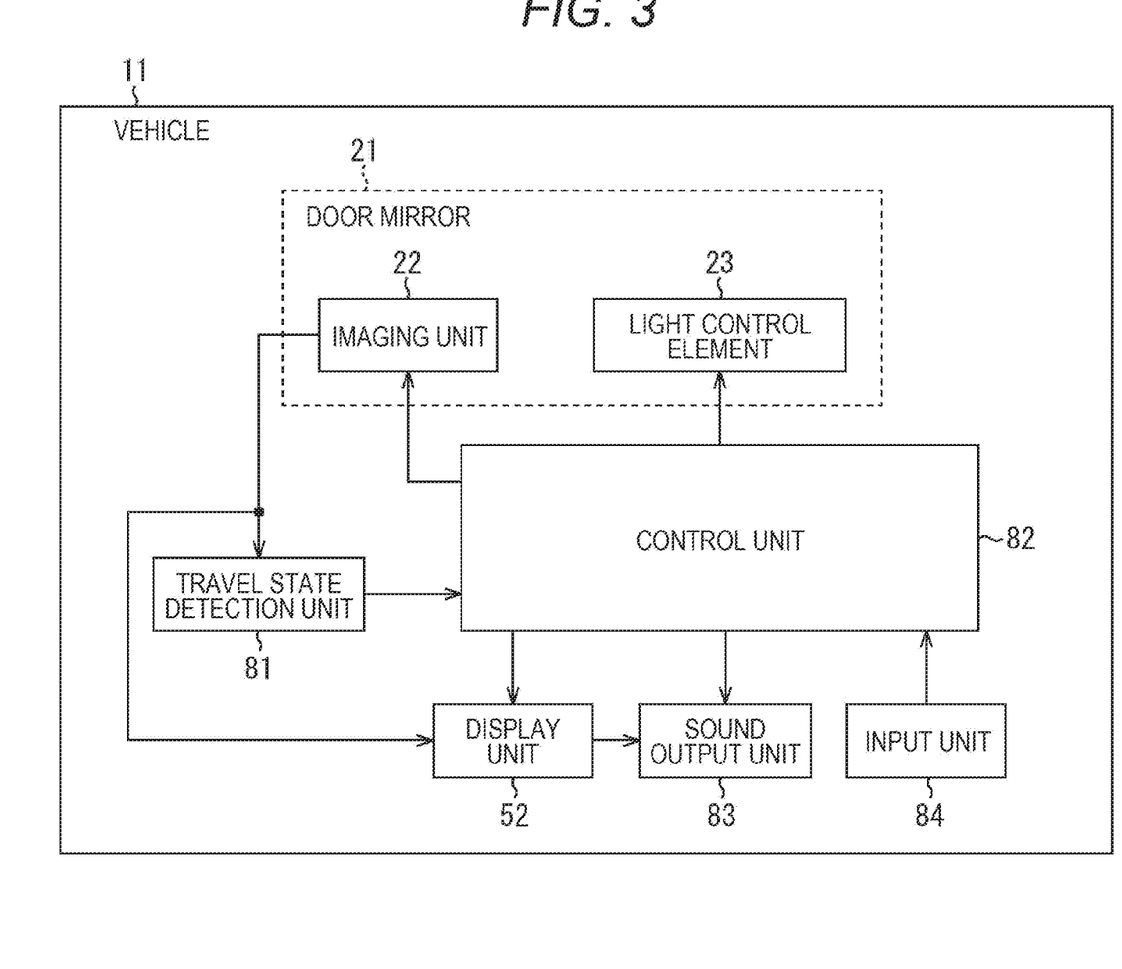
FIG. 3 is a diagram illustrating an exemplary configuration of a vehicle.

FIG. 3 is a diagram illustrating the exemplary functional configuration of the vehicle 11. Note that, in FIG. 3, portions corresponding to those in the case of FIG. 2 are denoted by the same reference signs, and the description thereof will be omitted as appropriate.

The vehicle 11 illustrated in FIG. 3 includes the imaging unit 22, the light control element 23, a travel state detection unit 81, a control unit 82, the display unit 52, a sound output unit 83, and an input unit 84.

The travel state detection unit 81 detects a travel state of the vehicle 11, such as a vehicle speed and a travel direction of the vehicle 11, on the basis of an image signal of a captured image supplied from the imaging unit 22 and output of another sensor or the like provided in the vehicle 11, and supplies the detection result to the control unit 82. Additionally, the travel state detection unit 81 may detect, from the captured image, an object such as an obstacle, and may supply the detection result to the control unit 82.

The control unit 82 controls behavior of the entire vehicle 11.

For example, the control unit 82 variably controls the light control element 23 to become either the transmissive state or the mirror surface state by, for example, applying voltage to the light control element 23 or the like on the basis of a signal supplied from the input unit 84, or causes the imaging unit 22 to capture an image when the light control element 23 is in the transmissive state.

Additionally, the control unit 82 implements operational assistance to the vehicle 11 and controls display of various kinds of images on the display unit 52 or sound output from the sound output unit 83 by, for example, controlling drive of an engine and a brake (not illustrated) on the basis of the detection result of the travel state, the object detection result, or the like supplied from the travel state detection unit 81.

The display unit 52 is connected to the imaging unit 22 by, for example, an electric wire, receives supply of an image signal of a captured image from the imaging unit 22, and displays the captured image. Additionally, in a case where no image signal is supplied from the imaging unit 22, the display unit 52 itself displays a warning indicating that no captured image is displayable, or controls the sound output unit 83 to output a warning with sound.

The sound output unit 83 includes, for example, a speaker and the like, and outputs various kinds of sound under the control of the display unit 52 and the control unit 82.

The input unit 84 includes buttons, switches, and the like, and supplies the control unit 82 with a signal in accordance with operation by a user such as a vehicle operator. For example, the vehicle 11 is provided with a light control switch as the input unit 84, and the vehicle operator or the like can provide a command for state control by operating the light control switch so as to set the light control element 23 to either the transmissive state or the mirror surface state.

Description of Imaging Processing

Subsequently, specific behavior of the vehicle 11 will be described.

Figure 4:
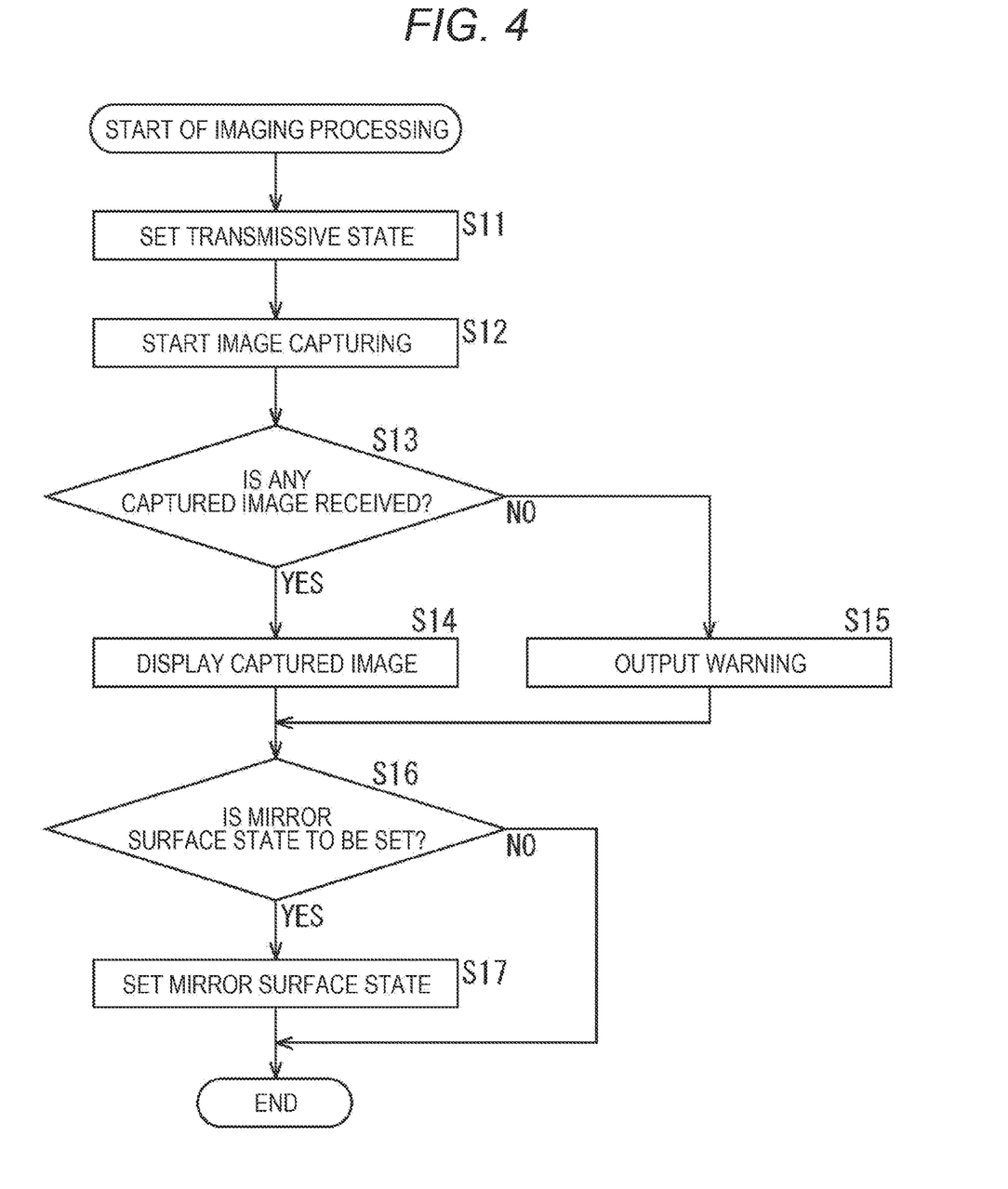
FIG. 4 is a flowchart to describe imaging processing.

In other words, imaging processing by the vehicle 11 will be described below with reference to a flowchart of FIG. 4. This imaging processing is repeatedly and continuously performed, for example, after the vehicle 11 is activated until activation of the vehicle 11 is stopped.

In step S11, the control unit 82 sets the light control element 23 to the transmissive state by controlling the voltage applied to the light control element 23 so that the applied voltage becomes less than the threshold voltage. Consequently, the light from the outside is incident on the imaging unit 22 through the light control element 23.

In the vehicle 11, when there is no malfunction in the imaging unit 22 or the like and each of the blocks necessary to capture an image and display the captured image behaves normally, the light control element 23 is controlled so as to become the transmissive state continuously. Note that once the light control element 23 is set to the mirror surface state due to malfunction of the imaging unit 22 or the like, the state may be continuously kept in the mirror surface state until certain operation is performed.

In step S12, the imaging unit 22 starts image capturing.

In other words, the control unit 82 commands the imaging unit 22 to start image capturing. Then, the imaging unit 22 captures an image in accordance with the command from the control unit 82, and supplies an obtained image signal to the travel state detection unit 81 and the display unit 52.

Additionally, the travel state detection unit 81 detects a travel state of the vehicle 11 on the basis of the image signal of the captured image supplied from the imaging unit 22 or the like, and supplies the detection result to the control unit 82. The control unit 82 executes processing to implement travel assistance to the vehicle 11 as appropriate on the basis of the detection result of the travel state supplied from the travel state detection unit 81.

In step S13, the display unit 52 determines whether or not any image signal of a captured image is received (supplied) from the imaging unit 22.

Note that whether or not any image signal of a captured image is received is determined not by the display unit 52 but by the travel state detection unit 81, and the determination result may be supplied to the control unit 82. In such a case, the control unit 82 controls the display unit 52 and the sound output unit 83 in accordance with the determination result from the travel state detection unit 81, and outputs a warning as appropriate.

In a case where it is determined in step S13 that an image signal is received, in other words, in a case where the image signal is supplied from the imaging unit 22 to the display unit 52, the processing proceeds to step S14.

In step S14, the display unit 52 displays the captured image on the basis of the image signal supplied from the imaging unit 22. Consequently, a vehicle operator or the like can check, with high visibility, the rear side of the vehicle 11 by looking at the captured image.

After the captured image is displayed on the display unit 52, the processing proceeds to step S16.

On the other hand, in a case where it is determined in step S13, that no image signal is received, in other words, in a case where no image signal is supplied from the imaging unit 22 to the display unit 52, the processing proceeds to step S15.

In step S15, the sound output unit 83 outputs a warning sound message.

In other words, in a case where no image signal is received and no captured image is displayed on the display unit 52, the display unit 52 commands the sound output unit 83 to output a warning. Then, the sound output unit 83 reproduces, on the basis of a sound signal preliminarily recorded, a sound message as the warning to notify the vehicle operator or the like of a fact that no captured image is displayable. Also, the display unit 52 may display a text message or an image as the warning to provide the notification of the fact that no captured image is displayable.

Note that either reproduction of the warning sound by the sound output unit 83 or the warning display by the display unit 52 may be performed as the warning output, or both thereof may be performed, for example. Furthermore, the warning may be output by vibration, or may be performed by combining arbitrary sound, an image, vibration, and the like.

When the warning is output from the display unit 52 or the sound output unit 83, the vehicle operator or the like can easily and instantaneously grasp, from the warning, a situation in which no captured image in which the rear side of the vehicle 11 is set as a subject is displayed on the display unit 52, that is, malfunction is occurring in the imaging unit 22 or the like.

For example, after checking the display of the display unit 52 or the like in accordance with the warning, the vehicle operator or the like determines whether or not to visually check the rear side of the vehicle 11 on the visual field surface by changing the light control element 23 to the mirror surface state, and suitably operates the light control switch as the input unit 84 in accordance with the determination.

Furthermore, when the vehicle operator or the like determines that there is some kind of failure even though no warning is output, the vehicle operator or the like suitably operates the light control switch as the input unit 84.

When the captured image is displayed in step S14 or when the warning is output in step S15, the control unit 82 determines whether or not to set the light control element 23 to the mirror surface state in step S16.

For example, in a case where a signal causing the light control element 23 to be changed to the mirror surface state is supplied to the control unit 82 from the light control switch as the input unit 84, it is determined that the light control element 23 is to be set to the mirror surface state.

In a case where it is determined in step S16 that the light control element 23 is not to be set to the mirror surface state, the light control element 23 is kept in the transmissive state, and the imaging processing ends.

In contrast, in a case where it is determined in step S16 that the light control element 23 is to be set to the mirror surface state, the control unit 82 sets the light control element 23 to the mirror surface state by applying the voltage of the threshold voltage or higher to the light control element 23 in step S17, and the imaging processing ends.

Consequently, most of the light from the rear side of the vehicle 11 is reflected by the light control element 23, and the vehicle operator or the like can check clearly the rear side of the vehicle 11 by looking at the visual field surface of the light control element 23. Furthermore, when the light control element 23 is set to the mirror surface state, the control unit 82 controls the imaging unit 22 to stop image capturing.

As described above, when there is no malfunction in the imaging unit 22 or the like and the imaging unit 22 or the like is in a normal state, the vehicle 11 sets the light control element 23 to the transmissive state and displays the captured image on the display unit 52, and when the imaging unit 22 or the like malfunctions and the captured image is not displayable, a warning is output. Additionally, the vehicle 11 switches the state of the light control element 23 from the transmissive state to the mirror surface state in accordance with operation made at the light control switch by the vehicle operator or the like.

Thus, visibility of the rear side of the vehicle 11 can be improved even when the image of the rear side of the vehicle 11 is presented to the vehicle operator or the like by using the captured image while the light control element 23 is set to the transmissive state and also even when the rear side of the vehicle 11 can be visually checked on the visual field surface while the light control element 23 is set to the mirror surface state. Furthermore, since the visibility of the rear side of the vehicle 11 is improved, safety can be improved.

Particularly, decrease in a waveform transmittance like the case of using the half mirror or the like does not occur because the light control element 23 is set to the transmissive state at the time of displaying a captured image. Therefore, the capture imaged with high image quality can be obtained. Additionally, when the imaging unit 22 or the like malfunctions, the vehicle operator or the like can visually check, with high visibility, the rear side of the vehicle 11 by setting the light control element 23 to the mirror surface state.

Second Embodiment

Description of Imaging Processing

Note that an example in which a warning is output in a case where an imaging unit 22 or the like malfunctions and a captured image is not displayable on a display unit 52 has been described above.

However, there may be a case where there is no malfunction of the imaging unit 22 or the like but a visual field of the imaging unit 22 becomes unclear due to situations such as: when a direction of a visual field, that is, an imaging direction of the imaging unit 22 is directed in an unintended direction due to vibration or impact during traveling; when weather is rainy or snowy; or when the inside of a door mirror 21 is fogged or dirty.

In such a case, a region in the unintended direction, that is, a direction different from a rear side of a vehicle 11 is projected on a captured image as a subject, or a subject on the captured image is unclear, and it may be difficult to clearly check the rear side of the vehicle 11.

To overcome such situations, in a case where imaging is performed in the unintended direction or in a case where an imaging environment is bad, such as when the weather is rainy or the like, or when the inside of the door mirror 21 is fogged, a warning may be output to a vehicle operator or the like so that the vehicle operator or the like can appropriately handle such situations by operating a light control switch, or the like.

Figure 5:
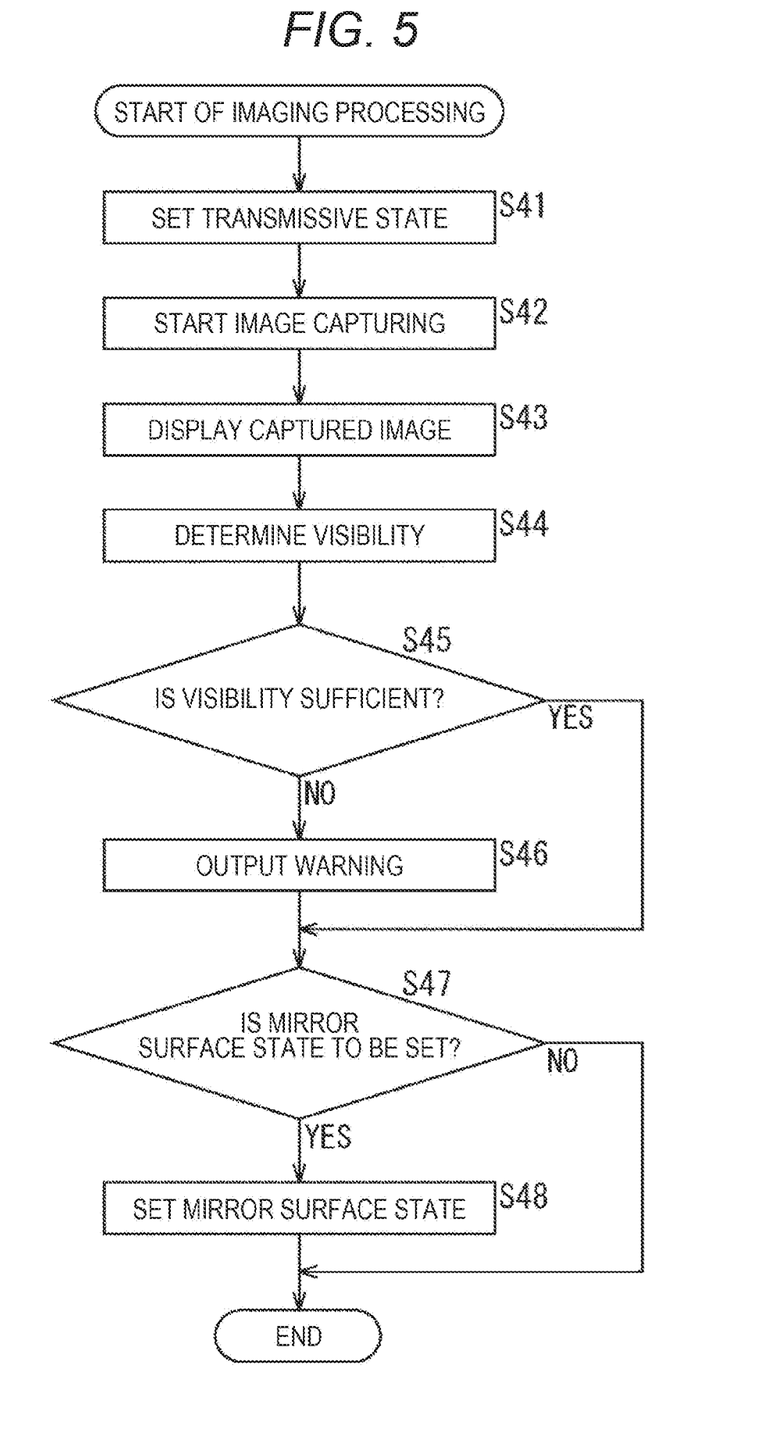
FIG. 5 is a flowchart to describe imaging processing.

In the case of outputting a warning when image capturing is performed in the unintended direction or in the case where the imaging environment is bad, imaging processing illustrated in FIG. 5 is performed in the vehicle 11, for example.

The imaging processing by the vehicle 11 will be described below with reference to a flowchart of FIG. 5. Note that a description of processing in step S41 and step S42 will be omitted because the processing is similar to processing in step S11 and step S12 in FIG. 4.

In step S43, the display unit 52 displays a captured image on the basis of an image signal supplied from the imaging unit 22.

In step S44, a travel state detection unit 81 determines whether or not visibility of the rear side of the vehicle 11 is sufficient on the basis of the image signal of the captured image supplied from the imaging unit 22. In other words, determination processing on the visibility is performed.

For example, the travel state detection unit 81 acquires a contrast evaluation value indicating a contrast degree of the captured image on the basis of the image signal, and in a case where a value of the contrast evaluation value is a predetermined threshold value or higher, it is determined that the visibility is sufficient.

For example, in a case where the visual field is bad due to the rainy or snowy weather, in a case where the inside of the door mirror 21 is fogged or dirty, in a case where the imaging direction of the imaging unit 22 is changed due to impact or the like and only the sky is projected as a subject, or the like, the contrast of the captured image is low. Therefore, the contrast evaluation value is also low.

Additionally, when the visual field of the imaging unit 22 is blocked and in a case where a captured image becomes black or white due to malfunction of a pixel or the like of the imaging unit 22 although an image signal is output, the contrast of the captured image is also low. Therefore, the contrast evaluation value is also low.

In a case where the contrast evaluation value is low as described above, there is a high possibility that the rear side of the vehicle 11, that is, a desired direction on a space cannot be clearly checked in the captured image. Therefore, when the contrast evaluation value is lower than the threshold value, the travel state detection unit 81 determines that the visibility is insufficient.

Furthermore, the travel state detection unit 81 may also determine that the visibility is insufficient when a difference between frames of the captured image is acquired and the acquired difference is large, in other words, when the sum of differences in pixel values of pixels having the same positional relation between different frames of the captured image is a predetermined threshold value or larger, for example.

For example, in a case where the visual field of the imaging unit 22 is rapidly largely changed due to impact or the like to the imaging unit 22 while the vehicle 11 is traveling and the imaging unit 22 is directed in an unintended direction such as above the vehicle 11, the difference between the frames of the captured image becomes large.

Accordingly, when the difference between the frames of the captured image is the threshold value or larger, the travel state detection unit 81 determines that visibility is insufficient.

Note that whether or not the visibility of the subject on the rear side of the vehicle 11 on the captured image, that is, the subject located on the rear side of the vehicle 11 is sufficient is not limitedly determined by the above-described contrast evaluation value and the difference between the frames of the captured image, and may be determined by any method. For example, a change in the direction of the imaging unit 22 in a view from the vehicle 11, that is, a deviation of a fixed position of the imaging unit 22 may be detected by a sensor, and whether or not the visibility is sufficient may be determined on the basis of the detection result. Additionally, the visibility may be determined by combining arbitrary plural methods such as the method using the contrast evaluation value.

When the travel state detection unit 81 performs the determination processing on the visibility on the basis of the image signal of the captured image, the travel state detection unit 81 supplies a result of the determination processing to the control unit 82.

In step S45, the control unit 82 determines whether or not the visibility of the rear side of the vehicle 11 in the captured image is sufficient in the captured image on the basis of the result of the determination processing supplied from the travel state detection unit 81.

In a case where it is determined in step S45 that the visibility is sufficient, processing of step S46 is skipped and then the processing subsequently proceeds to step S47.

In contrast, in a case where it is determined in step S45 that the visibility is not sufficient, the control unit 82 commands a sound output unit 83 to output a warning, and the processing proceeds to step S46.

In step S46, the sound output unit 83 outputs a warning sound message in accordance with the command from the control unit 82, and then the processing proceeds to step S47.

For example, in step S46, the sound message notifying the vehicle operator or the like of a fact that the captured image is unclear is reproduced, or the like, as the warning. Additionally, similar to the case of step S15 in FIG. 4, the control unit 82 may control the display unit 52 so that the display unit 52 outputs a warning by a text message or the like, or it may be also possible to output a warning by combining the display by the display unit 52, the sound by the sound output unit 83, and the like.

Since the warning is output as described above, the vehicle operator or the like can easily and instantaneously grasp a situation in which the rear side of the vehicle 11 cannot be checked with sufficient visibility in the captured image. When the vehicle operator or the like checks the display unit 52 or the like in accordance with the warning, the vehicle operator or the like operates the light control switch as an input unit 84 as necessary.

When it is determined that the visibility is sufficient in step S45 or when the warning is output in step S46, subsequently the processing of step S47 and step S48 are performed and the imaging processing ends. Note that a description of the processing in step S47 and step S48 will be omitted because the processing is similar to the processing in step S16 and step S17 in FIG. 4.

As described above, the vehicle 11 determines whether or not the visibility of the rear side of the vehicle 11 is sufficient on the captured image on the basis of an image signal of the captured image, and the warning is output in accordance with the determination result. Additionally, the vehicle 11 switches a state of a light control element 23 from a transmissive state to a mirror surface state in accordance with operation made at the light control switch by the vehicle operator or the like. Consequently, not only the visibility of the rear side of the vehicle 11 can be improved but also safety can be improved.

Note that, in the imaging processing described with reference to FIG. 5, a warning may also be output in accordance with whether or not an image signal of a captured image is received in a manner similar to the case of imaging processing described with reference to FIG. 4.

Furthermore, the embodiment of the present technology is not limited to the above-described embodiments, and various kinds of modifications can be made within a range without departing from a gist of the present technology.

For example, the present technology can have a cloud computing configuration in which processing is conjointly performed by sharing one function among a plurality of devices via a network.

Furthermore, each of the steps described in the above-described flowcharts can be executed not only by one device but also by the plurality of devices in a sharing manner.

Moreover, in a case where a plurality of kinds of processing is included in one step, the plurality of kinds of processing included in the one step can be executed not only by one device but also by the plurality of devices in a sharing manner.

Furthermore, the present technology may have the following configurations.

(1)

An imaging device including:

an imaging unit; and a light control element arranged at a position intersecting with an optical axis of the imaging unit and adapted to change a transmittance or a reflectance of light when a predetermined condition is satisfied.

(2)

The imaging device recited in (1), in which the light control element includes an electrochromic material, a thermochromic material, or a gas chromic material.

(3)

The imaging device recited in (1), in which the light control element changes the transmittance or the reflectance in accordance with applied voltage or applied current.

(4)

The imaging device recited in (3), in which the light control element is set, in accordance with the applied voltage or the applied current, to a mirror surface state in which incident light is reflected or to a transmissive state in which the incident light is transmissive.

(5)
The imaging device recited in any one of (1) to (4), in which the imaging device is attached to a vehicle.

(6)
The imaging device recited in (5), in which the imaging unit is arranged at a position where the imaging unit can capture an image of a rear side of the vehicle.

(7)
The imaging device recited in (5), in which the imaging device can capture an image of a periphery of the vehicle and is arranged at a position visible from an occupant on a seat of the vehicle.

(8)
A display system including:
an imaging unit;
a light control element arranged at a position intersecting with an optical axis of the imaging unit and adapted to change a transmittance or a reflectance of light when a predetermined condition is satisfied; and
a display unit adapted to display an image captured by the imaging unit.

(9)
The display system recited in (8), in which the light control element includes an electrochromic material, a thermochromic material, or a gas chromic material.

(10)
The display system recited in (8), in which the light control element changes the transmittance or the reflectance in accordance with applied voltage or applied current.

(11)
The display system recited in (10), in which the light control element is set, in accordance with the applied voltage or the applied current, to a mirror surface state in which incident light is reflected or to a transmissive state in which the incident light is transmissive.

(12)
The display system recited in (11), further including a control unit adapted to change the light control element to either the transmissive state or the mirror surface state in accordance with operation by a user.

(13)
The display system recited in any one of (8) to (12), further including a warning output unit adapted to output a warning in a case where no image is received in the display unit.

(14)
The display system recited in any one of (8) to (13), further including:
a determination unit adapted to determine visibility in the image on the basis of the image; and
a warning output unit adapted to output a warning in accordance with a determination result by the determination unit.

(15)
The display system recited in any one of (8) to (14), in which the imaging unit and the light control element are attached to a vehicle.

(16)
The display system recited in (15), in which the imaging unit is arranged at a position where the imaging unit can capture an image of a rear side of the vehicle.

(17)
The display system recited in (15), in which the imaging unit can capture an image of a periphery of the vehicle and the light control element is arranged at a position visible from an occupant on a seat of the vehicle.

(18)
A display method in a display system including:
an imaging unit;
a light control element arranged at a position intersecting with an optical axis of the imaging unit and adapted to change a transmittance or a reflectance of light when a predetermined condition is satisfied; and
a display unit adapted to display an image captured by the imaging unit;
the display method including steps of:
capturing, by the imaging unit, the image by receiving incident light through the light control element; and
displaying the image by the display unit.

REFERENCE SIGNS LIST

11 Vehicle
21 Door mirror
22 Imaging unit
23 Light control element
52 Display unit
81 Travel state detection unit
82 Control unit
83 Sound output unit
84 Input unit

The invention claimed is:
1. An imaging device, comprising:
an imaging unit; and
a light control element at a specific position in the imaging device, wherein
the light control element includes a gas chromic material,
the specific position intersects with an optical axis of the imaging unit,
the light control element is configured to change at least one of a light transmittance of the light control element into a light reflectance of the light control element or the light reflectance of the light control element into the light transmittance of the light control element,
the change of the at least one of the light transmittance or the light reflectance is based on an atmosphere gas,
the imaging device is attachable to a vehicle, and
the imaging unit is configured to:
receive an incident light from outside of the imaging device through the light control element;
capture an image based on the received incident light; and
transmit an image signal of the captured image to a determination unit of the vehicle, wherein
the determination unit determines visibility in the captured image based on the image signal of the captured image, and
a warning output unit of the vehicle outputs a warning based on the determined visibility.
2. The imaging device according to claim 1, wherein
the light control element is associated with a mirror surface state in which the incident light is reflective and a transmissive state in which the incident light is transmissive, and
the light control element is set to one of the mirror surface state or the transmissive state based on the atmosphere gas.

3. The imaging device according to claim 1, wherein the captured image is an image of a rear side of the vehicle.

4. The imaging device according to claim 1, wherein
the captured image is an image of a periphery of the vehicle, and
the imaging device is viewable from an occupant on a seat of the vehicle.

5. A display system, comprising:
an imaging unit;
a light control element at a specific position in the display system, wherein
the specific position intersects with an optical axis of the imaging unit,
the light control element is configured to change at least one of a light transmittance or a light reflectance of the light control element based on a specific condition, and
the imaging unit is configured to:
receive an incident light from outside of the display system through the light control element; and
capture an image based on the received incident light;
a display unit configured to display the captured image;
a determination unit configured to determine visibility in the captured image; and
a warning output unit configured to output a warning based on the determined visibility.

6. The display system according to claim 5, wherein the light control element includes one of an electrochromic material, a thermochromic material, or a gas chromic material.

7. The display system according to claim 5, wherein the light control element is further configured to change one of the light transmittance or the light reflectance based on a voltage or a current applied to the light control element.

8. The display system according to claim 7, wherein
the light control element is associated with a mirror surface state in which the incident light is reflective and a transmissive state in which the incident light is transmissive, and
the light control element is set to one of the mirror surface state or the transmissive state based on one of the applied voltage or the applied current.

9. The display system according to claim 8, further comprising a control unit configured to change the light control element to one of the transmissive state or the mirror surface state based on a user operation.

10. The display system according to claim 5, wherein the imaging unit and the light control element are attachable to a vehicle.

11. The display system according to claim 10, wherein the captured image is an image of a rear side of the vehicle.

12. The display system according to claim 10, wherein
the captured image is an image of a periphery of the vehicle, and
the specific position of the light control element is viewable from an occupant on a seat of the vehicle.

13. A display method, comprising:
in a display system that includes an imaging unit, a light control element, a determination unit, a warning output unit, and a display unit, wherein
the light control element is at a specific position in the display system, and
the specific position intersects with an optical axis of the imaging unit:
changing, by the light control element, at least one of a light transmittance or a light reflectance of the light control element based on a specific condition;
receiving, by the imaging unit, an incident light from outside of the display system through the light control element;
capturing, by the imaging unit, an image based on the received incident light;
displaying the captured image by the display unit;
determining, by the determination unit, visibility in the captured image; and
outputting, by the warning output unit, a warning based on the determined visibility.

* * * * *